(12) United States Patent
VanBlon et al.

(10) Patent No.: US 11,010,042 B2
(45) Date of Patent: May 18, 2021

(54) DISPLAY OF DIFFERENT VERSIONS OF USER INTERFACE ELEMENT

(71) Applicant: Lenovo (Singapore) Pte. Ltd., Singapore (SG)

(72) Inventors: Russell Speight VanBlon, Raleigh, NC (US); Shirley Mary McKenna, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1029 days.

(21) Appl. No.: 14/179,912

(22) Filed: Feb. 13, 2014

(65) Prior Publication Data
US 2015/0227301 A1  Aug. 13, 2015

(51) Int. Cl.
*G06F 3/0488* (2013.01)
*G06F 3/01* (2006.01)
*G06F 3/0481* (2013.01)

(52) U.S. Cl.
CPC ............ *G06F 3/0488* (2013.01); *G06F 3/013* (2013.01); *G06F 3/04817* (2013.01)

(58) Field of Classification Search
CPC . G06F 9/4443; G06F 8/38; G06F 8/34; G06F 9/45512; G06F 3/013; G06Q 10/10
USPC ......................................... 715/762, 764, 808
See application file for complete search history.

(56) References Cited

U.S. PATENT DOCUMENTS

| | | | | |
|---|---|---|---|---|
| 5,805,167 A * | 9/1998 | van Cruyningen | ... | G06F 3/0482 715/808 |
| 6,456,262 B1 * | 9/2002 | Bell | ....................... | A61B 3/113 345/472 |
| 8,255,836 B1 * | 8/2012 | Gildfind | .............. | G06F 3/04812 345/173 |
| 9,377,863 B2 * | 6/2016 | Bychkov | ................. | G06F 3/017 |
| 9,606,621 B2 * | 3/2017 | Lashina | ................... | G06F 3/013 |
| 2009/0183112 A1 * | 7/2009 | Higgins | ................. | G06Q 30/02 715/808 |
| 2009/0288044 A1 * | 11/2009 | Matthews | ............. | G06F 3/0482 715/863 |
| 2011/0254865 A1 * | 10/2011 | Yee | ......................... | G06F 3/013 345/661 |
| 2014/0354554 A1 * | 12/2014 | Devi | ...................... | G06F 3/0488 345/173 |
| 2014/0375544 A1 * | 12/2014 | Venable | .................. | G06F 3/013 345/156 |
| 2015/0103003 A1 * | 4/2015 | Kerr | ........................ | G06F 3/013 345/158 |
| 2015/0135096 A1 * | 5/2015 | Dhara | ................... | H04L 65/403 715/753 |
| 2015/0227289 A1 * | 8/2015 | Nagara | ................. | G06F 3/0488 715/808 |
| 2015/0301595 A1 * | 10/2015 | Miki | ...................... | A61B 3/113 715/847 |

* cited by examiner

*Primary Examiner* — Tadesse Hailu
(74) *Attorney, Agent, or Firm* — Schwegman Lundberg & Woessner, P.A.

(57) ABSTRACT

A method includes detecting interaction with a user interface element corresponding to an app on a touch screen and displaying a different version of the user interface element responsive to the detected interaction.

18 Claims, 3 Drawing Sheets

DISPLAY OF DIFFERENT VERSIONS OF USER INTERFACE ELEMENT

BACKGROUND

Widgets for devices with displays, such as mobile devices, provide a user interface construct that allows a user to interact with an application without launching the entire application. In many devices, home screen widgets are usually small and difficult to interact with. Home screen widgets compete for screen space with other app icons and widgets. Current widgets launch to different app features based on a portion of the widget selected by a user. However, selecting a portion of the widget may also launch into the entire app, obscuring other app icons and widgets.

SUMMARY

A method includes detecting interaction with a user interface element corresponding to an app on a touch screen and displaying a different version of the user interface element responsive to the detected interaction.

A machine readable storage device has instructions for execution by a processor of the machine to perform detecting interaction with a user interface element corresponding to an app on a touch screen, and displaying a different version of the user interface element responsive to the detected interaction.

A device includes a processor and a memory device having a program stored thereon for execution by the processor to detect interaction with a user interface element corresponding to an app on a touch screen and display a different version of the user interface element responsive to the detected interaction.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of hardware based storage devices, either local or networked. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system. The article "a" or "an" means "one or more" unless explicitly limited to a single one.

In various embodiments, an app icon or widget, hereinafter user interface element (UIE), displayed on a device screen may be interacted with by a user. The interactions may include hovering over the UIE, tapping or otherwise selecting the UIE, detecting via eye tracking that the user is gazing at the UIE, or otherwise interacting with the UIE. When the device detects interaction with the UIE, the UIE or may dynamically change to show additional app features items that may be selected or to facilitate ease of interaction with already displayed app features without launching the app.

Figure 1:
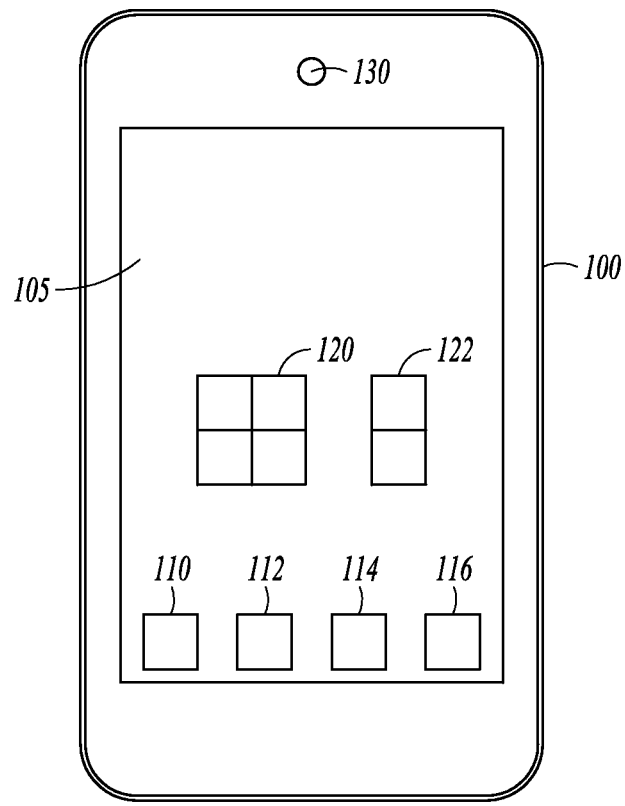
FIG. 1 is a block diagram of a device having user interface element according to an example embodiment.

FIG. 1 is a block diagram of a mobile device 100 having a touchscreen 105 on which one or more UIEs such as app icons 110, 112, 114, 116 and widgets 120, 122 may be displayed. In one embodiment, a home screen of a smart phone is displayed on touchscreen 105. A camera 130 may also be included on a screen side of the mobile device 100 to detect and track user gaze. The touchscreen 105 may also include sensors to detect touch and near touch or hovering objects, such as user fingers, stylus, or other objects that may be used to interact with UIEs.

In one embodiment, widget 120 has four areas that correspond to four different functions of a corresponding app that may be selected via the widget. Widget 122 has two such areas. In some embodiments, the areas may be referred to as sub-elements of a UIE.

Figure 2:
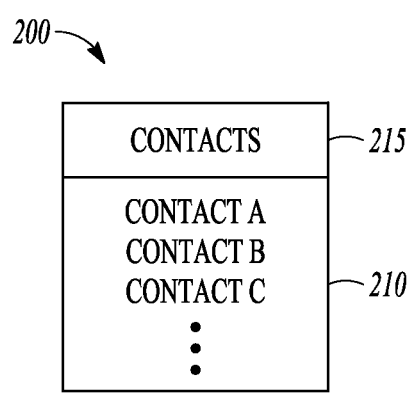
FIG. 2 is a block diagram of a different version of a user interface element according to an example embodiment.

In one example, app icon 114 corresponds to a contact app. Interaction with the app icon 114, such as by hovering over the app icon, selecting the app icon by touching or clicking, looking at the icon, or other interaction cause the app icon 114 to expand into further sub-elements as illustrated at 200 in FIG. 2 to show multiple contacts at 210 without fully opening the app in a manner that would fill the screen. Instead, the app icon may interface with the app to retrieve data corresponding to the multiple contacts without opening the app into a top level window on the screen. The expanded app icon 200 may be larger than the original app icon 114 to provide for convenient access to the displayed contacts for selection by the user. A portion 215 may be selected to open the full contact app if desired, or the user may simply select one of the displayed contacts.

In one embodiment, one or more contacts, may be displayed, and may include the most often selected contacts, a favorites list previously identified by the user, or may even selected based on context and past usage. Five contacts may be displayed in one embodiment. The number displayed may vary based on context, screen real estate, available without interfering with viewing other UIEs, or other factors as desired.

The context on which selection may be based may include temporal calling patterns, such as the user historically calling their spouse at 5 PM every workday. A different list may be provided a noon, when a user typically calls an office mate for lunch. The list may also vary based on calendar information, such as a conference call being scheduled to start about the time the app icon 114 is interacted with. In still further embodiments, the expanded app icon 200 may appear based on a calendar event, such as a conference call, with the list including the conference call dial in number. Many of these different embodiments may be selectable as preferences by the user.

Figure 3:
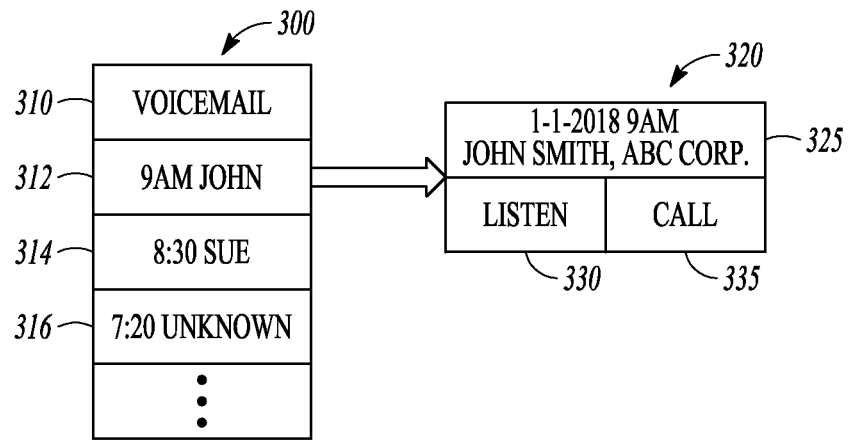
FIG. 3 is a block diagram of a further different version of a user interface element according to an example embodiment.

FIG. 3 is a block diagram of an expanded voice mail app icon 300 corresponding to a voicemail app selectable by app icon 112. In one embodiment, the expanded icon 300 includes a sub-element 310 to select the full voice mail app, and also includes multiple sub-elements, such as entries 312, 314, 316 corresponding to selectable voicemails. Interacting with entry 312, a voicemail from John at 9 AM, may result in a further expanded UIE 320 which may provide more detail about the call at 325 and provide options selectable to listen to the voicemail at 330, or to directly call John at 335. Further options may be provided as desired, such as opening a contact for John, erasing the voicemail, requesting a transcription of the voicemail, locating John, or other options as desired.

In one embodiment, the type of interaction with a UIE may determine an action taken. For example, if one directly selects entry 312 such as by tapping it, an expected action, such as playing the corresponding voicemail may occur. However, if one interacts with entry 312 by hovering over it or gazing at it, expanded UIE 320 may appear, providing more options, all without the need to open the entire app.

Figure 4A:
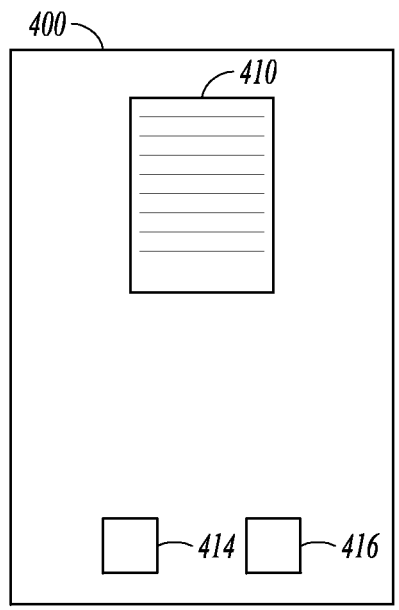
FIGS. 4A and 4B is a block diagram of a touchscreen display showing different versions of a user interface element according to an example embodiment.
Figure 4B:
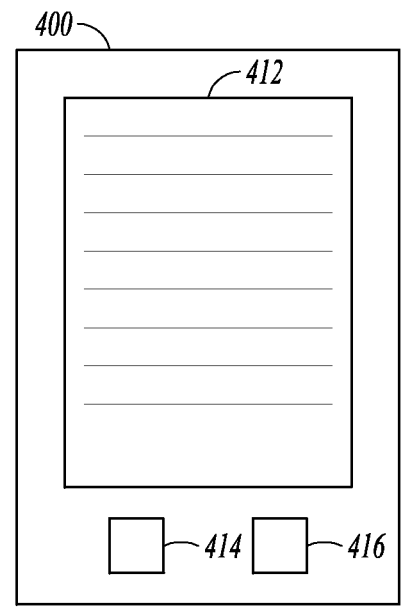

FIGS. 4A and 4B illustrate a display 400 with a UIE that is an expanding window. In one embodiment, a web browser or notepad window 410 in FIG. 4A may automatically grow or maximize as shown at 412 in FIG. 4B when a user does a certain amount of scrolling within the window. Growing the window 410, 412 provides for an easier interaction with the information in the window. After closing a corresponding app or switching to a second app, or otherwise ceasing interaction with the window, the window may shrink back down to its original size at 410 or to a minimum size needed for ease of use, such as facilitating switching back to scrolling. Based on where a user is gazing via eye tracking through camera 130, an app can grow or shrink based on how much screen real estate provides efficient interaction with the feature looked at by the user and permits interaction with other UIEs 414 and 416.

Figure 5:
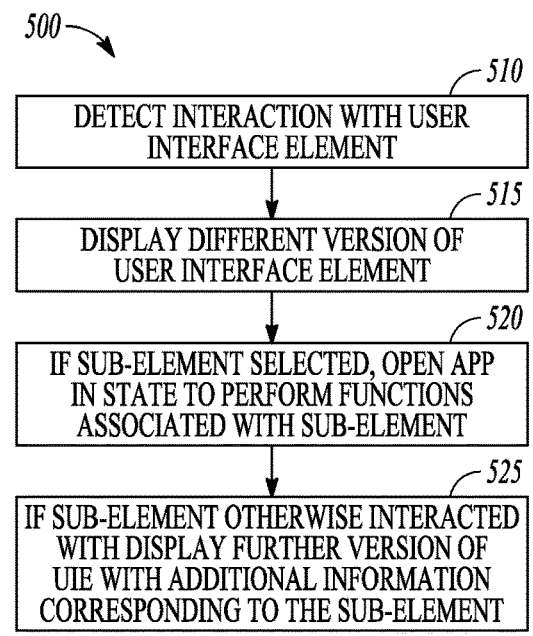
FIG. 5 is a flowchart illustrating a method of displaying different user interface elements according to an example embodiment.

FIG. 5 is a flowchart illustrating a method 500 of interacting with user interface elements to provide different versions of the user interface elements allowing further interaction with underlying apps without fully opening the apps. At 510, interaction with a UIE corresponding to an app on a touch screen is detected. As mentioned, there are various ways in which the interaction may occur. In some embodiments, such interaction may include one or more of hovering over the UIE, tapping or otherwise selecting the UIE, detecting via eye tracking that the user is gazing at the UIE, or otherwise interacting with the UIE.

At 515, a different version of the user interface element may be displayed responsive to the detected interaction. The different version may be smaller, the same size, or larger in size, and may also include multiple sub-elements facilitating selection of multiple functions of the app. In one embodiment, the sub-elements comprise a list of contacts from a contact app. The contacts may be selected as a function of time of day or other context. In one embodiment, a user may select a sub-element and case the app to be fully opened in a state that performs a function indicated by the sub-element as indicated at 520.

In a further embodiment, user interaction with a sub-element indicated at 525 may result in display of a further version of a user interface element that provides additional information corresponding to the sub-element.

An interaction with a UIE, as that phrase is used herein, is different than interaction with a typical window, which may be actively minimized, resized, and maximized by selecting interface constructs specifically designed to do so, such as grabbing and moving a window edge, or clicking on an icon to minimize or maximize it.

Figure 6:
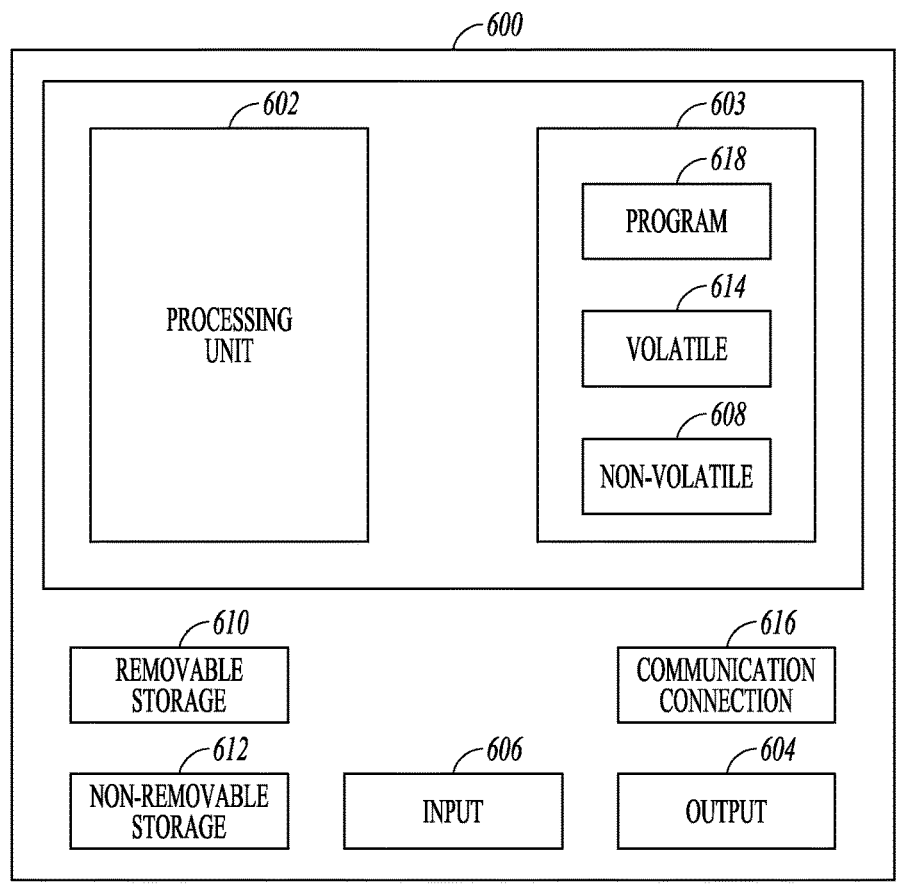
FIG. 6 is a block diagram of computer system used to implement methods according to example embodiments.

FIG. 6 is a block schematic diagram of a computer system 600 to implement device 100 and other computing resources according to example embodiments. All components need not be used in various embodiments, such as for mobile devices including laptop computers, smart phones, touchpads, and other devices. One example computing device in the form of a computer 600, may include a processing unit 602, memory 603, removable storage 610, and non-removable storage 612. Sensors 115 and 125 may be coupled to provide data to the processing unit 602. Memory 603 may include volatile memory 614 and non-volatile memory 608. Computer 600 may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 600 may include or have access to a computing environment that includes input 606, output 604, and a communication connection 616. Output 604 may include a display device, such as a touchscreen, that also may serve as an input device. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 602 of the computer 600. A hard drive, CD-ROM, and RAM are some examples of articles including a non-transitory computer-readable medium. For example, a computer program 618 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 600 to provide generic access controls in a COM based computer network system having multiple users and servers.

EXAMPLES

1. A method comprising:
   detecting interaction with a user interface element corresponding to an app on a touch screen;
   displaying a different version of the user interface element responsive to the detected interaction.

2. The method of example 1 wherein displaying a different version of the user interface element comprises displaying a larger version of the user interface element.

3. The method of example 2 wherein displaying the larger version of the user interface element comprises displaying multiple sub-elements facilitating selection of multiple functions of the app.

4. The method of example 3 wherein the sub-elements comprise a list of contacts from a contact app.

5. The method of example 4 and further comprising:
   detecting user interaction with a sub-element; and displaying a further version of a user interface element that provides additional information corresponding to the sub-element.

6. The method of any of examples 1-5 wherein detecting interaction with the user interface element comprises detecting hovering over the user interface element.

7. The method of any of examples 1-6 wherein detecting interaction with the user interface element comprises detecting touching the user interface element.

8. The method of any of examples 1-6 wherein detecting interaction with the user interface element comprises detecting that a user is looking at the user interface element via gaze tracking with a camera.

9. The method of any of examples 1-7 wherein displaying a different size version of the user interface element comprises displaying a smaller version of the user interface element when user interaction is no longer detected.

10. The method of any of examples 1-9 wherein the user interface element is a window, wherein the detected interaction comprises scrolling content within the window, and wherein the different version displayed comprises a larger window.

11. The method of any of examples 1-10 wherein displaying the different version of the user interface element comprises displaying multiple sub-elements facilitating selection of multiple functions of the app, the method further comprising:
    detecting user interaction with a sub-element; and
    displaying a further version of a user interface element that provides additional information corresponding to the sub-element.

12. A machine readable storage device having instructions for execution by a processor of the machine to perform:
    detecting interaction with a user interface element corresponding to an app on a touch screen;
    displaying a different version of the user interface element responsive to the detected interaction.

13. The machine readable storage device example 12 wherein displaying a different version of the user interface element comprises displaying a larger version of the user interface element that comprises multiple sub-elements facilitating selection of multiple functions of the app.

14. The machine readable storage device of example 13 wherein the sub-elements comprise a list of contacts from a contact app.

15. The machine readable storage device of example 14 and further comprising:
    detecting user interaction with a sub-element; and
    displaying a further version of a user interface element that provides additional information corresponding to the sub-element.

16. The machine readable storage device of any of examples 12-15 wherein detecting interaction with the user interface element comprises detecting hovering over the user interface element, touching the user interface element, or detecting that a user is looking at the user interface element via gaze tracking with a camera.

17. The machine readable storage device of any of examples 12-16 wherein displaying the different version of the user interface element comprises displaying multiple sub-elements facilitating selection of multiple functions of the app, the method further comprising:
    detecting user interaction with a sub-element; and
    displaying a further version of a user interface element that provides additional information corresponding to the sub-element.

18. A device comprising:
    a processor;
    a touch screen; and
    a memory device having a program stored thereon for execution by the processor to:
      detect interaction with a user interface element corresponding to an app on the touch screen;
      display a different version of the user interface element on the touch screen responsive to the detected interaction.

19. The device of example 18 wherein display of a different version of the user interface element comprises display of a version of the user interface element that comprises multiple sub-elements facilitating selection of multiple functions of the app.

20. The device of example 19 wherein the program further comprises code for execution by the processor to:
    detect user interaction with a sub-element; and
    display a further version of a user interface element that provides additional information corresponding to the sub-element.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
   detecting interaction with a first portion of a user interface element corresponding to an app on a touch screen, wherein the user interface element is one of multiple user interface elements, each corresponding to a different app and wherein a second portion of the user interface element is selectable to launch the corresponding app into a top level window of the app, wherein detecting interaction with the user interface element includes detecting that a user is looking at the user interface element via gaze tracking with a camera; and
   displaying a different version of the user interface element, without launching the corresponding app into a top level window of the app, responsive to the detected interaction with the first portion, wherein the different version of the user interface element includes at least one sub-element selectable to directly perform a function by the corresponding app without launching the corresponding app into the top level window of the app, and wherein displaying a different version of the user interface element includes growing the user interface element based on where the user is gazing.

2. The method of claim 1, wherein displaying a different version of the user interface element comprises displaying a larger version of the user interface element with at least one sub-element not present in the interacted with user interface element.

3. The method of claim 2, wherein displaying the larger version of the user interface element comprises displaying multiple sub-elements facilitating selection of multiple functions of the app without launching the corresponding app into the top level window of the app.

4. The method of claim 3, wherein the sub-elements comprise a list of contacts from a contact app.

5. The method of claim 4, and further comprising:
detecting user interaction with a sub-element that contains information stored by the app; and
displaying a further version of a user interface element that provides additional information corresponding to the sub-element, wherein the further version of the user interface element provides options to select functions of the app without launching the corresponding app into the top level widow of the app.

6. The method of claim 1, wherein detecting interaction with the user interface element comprises detecting hovering over the user interface element.

7. The method of claim 1, wherein detecting interaction with the user interface element comprises detecting touching the user interface element, and wherein tapping the user interface element causes launching of the app into the top level window of the app.

8. The method of claim 1, wherein displaying a different size version of the user interface element comprises displaying a smaller version of the user interface element when user interaction is no longer detected.

9. The method of claim 1, wherein the user interface element is a window, wherein the detected interaction comprises scrolling content within the window, and wherein the different version displayed comprises a larger window.

10. The method of claim 1, wherein displaying the different version of the user interface element comprises displaying multiple sub-elements facilitating selection of multiple functions of the app, the method further comprising:
detecting user interaction with a sub-element that contains information stored by the app; and
displaying a further version of a user interface element that provides additional information corresponding to the sub-element, wherein the further version of the user interface element provides options to select functions of the app without launching the corresponding app into the top level widow of the app.

11. A non-transitory machine readable storage device having instructions for execution by a processor of the machine to cause the processor to perform operations comprising:
detecting interaction with a first portion of a user interface element corresponding to an app on a touch screen, wherein the user interface element is one of multiple user interface elements, each corresponding to a different app and wherein a second portion of the user interface element is selectable to launch the corresponding app into a top level window of the app, wherein detecting interaction with the user interface element includes detecting that a user is looking at the user interface element via gaze tracking with a camera; and
displaying a different version of the user interface element, without launching the corresponding app into a top level window of the app, responsive to the detected interaction with the first portion, wherein the different version of the user interface element includes at least one sub-element selectable to directly perform a function by the corresponding app without launching the corresponding app into the top level window of the app, and wherein displaying a different version of the user interface element includes growing the user interface element based on where the user is gazing.

12. The non-transitory machine readable storage device claim 11, wherein displaying a different version of the user interface element comprises displaying a larger version of the user interface element that comprises multiple sub-elements facilitating selection of multiple functions of the app without launching the corresponding app into the top level window of the app.

13. The non-transitory machine readable storage device of claim 12, wherein the sub-elements comprise a list of contacts from a contact app.

14. The non-transitory machine readable storage device of claim 13, and further comprising:
detecting user interaction with a sub-element that contains information stored by the app; and
displaying a further version of a user interface element that provides additional information corresponding to the sub-element.

15. The non-transitory machine readable storage device of claim 11, wherein displaying the different version of the user interface element comprises displaying multiple sub-elements facilitating selection of multiple functions of the app, the method further comprising:
detecting user interaction with a sub-element; and
displaying a further version of a user interface element that provides additional information corresponding to the sub-element, wherein the further version of the user interface element provides options to select functions of the app without launching the corresponding app into the top level widow of the app.

16. A device comprising:
a processor;
a touch screen; and
a memory device having a program stored thereon for execution by the processor to:
detect interaction with a first portion of a user interface element corresponding to an app on the touch screen, wherein the user interface element is one of multiple user interface elements, each corresponding to a different app and wherein a second portion of the user interface element is selectable to launch the corresponding app into a top level window of the app, wherein detecting interaction with the user interface element includes detecting that a user is looking at the user interface element via gaze tracking with a camera; and
display a different version of the user interface element, without launching the corresponding app into a top level window of the app, on the touch screen responsive to the detected interaction with the first portion, wherein the different version of the user interface element includes at least one sub-element selectable to directly perform a function by the corresponding app without launching the corresponding app into the top level window of the app, and wherein displaying a different version of the user interface element includes growing the user interface element based on where the user is gazing.

17. The device of claim 16, wherein display of a different version of the user interface element comprises display of a version of the user interface element that comprises multiple sub-elements facilitating selection of multiple functions of the app with at least one sub-element not present in the interacted with user interface element.

18. The device of claim 17, wherein the program further comprises code for execution by the processor to:
- detect user interaction with a sub-element that contains information stored by the app; and
- display a further version of a user interface element that provides additional information corresponding to the sub-element, wherein the further version of the user interface element provides options to select functions of the app without launching the corresponding app into the top level widow of the app.

* * * * *